US008599437B2

(12) United States Patent
Yanagisawa

(10) Patent No.: US 8,599,437 B2
(45) Date of Patent: Dec. 3, 2013

(54) PRINTING CONTROL DEVICE, PRINTER DRIVER, CONVERSION DEVICE, PRINTER, PRINTING SYSTEM, CONTROL METHOD FOR A PRINTING CONTROL DEVICE, AND CONTROL METHOD FOR A PRINTER

(75) Inventor: Noboru Yanagisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 401 days.

(21) Appl. No.: 12/851,619

(22) Filed: Aug. 6, 2010

(65) Prior Publication Data
US 2011/0043836 A1 Feb. 24, 2011

(30) Foreign Application Priority Data

Aug. 21, 2009 (JP) ................................. 2009-191726
May 18, 2010 (JP) ................................. 2010-114025
May 18, 2010 (JP) ................................. 2010-114026

(51) Int. Cl.
*H04N 1/60* (2006.01)
*G06K 15/02* (2006.01)
*G06F 3/12* (2006.01)

(52) U.S. Cl.
USPC ........................... 358/1.9; 358/1.11; 358/1.13

(58) Field of Classification Search
USPC ........................................ 358/1.9, 1.13, 1.11
See application file for complete search history.

(56) References Cited

U.S. PATENT DOCUMENTS

| 6,236,752 B1 * | 5/2001 | Katayama et al. ............. 382/183 |
| 2004/0050941 A1 * | 3/2004 | Hanyu et al. ................... 235/487 |
| 2004/0090642 A1 | 5/2004 | Hikita |
| 2010/0134814 A1 * | 6/2010 | Oshima ........................... 358/1.9 |

FOREIGN PATENT DOCUMENTS

| JP | 07-129087 A | 5/1995 |
| JP | 08-324529 A | 12/1996 |
| JP | 2003-043918 A | 2/2003 |
| JP | 2003-182160 A | 7/2003 |

* cited by examiner

*Primary Examiner* — Twyler Haskins
*Assistant Examiner* — Henok Shiferaw
(74) *Attorney, Agent, or Firm* — Lowe Hauptman & Ham LLP

(57) ABSTRACT

Printout that enables the user to easily know printed information is produced. A print data acquisition unit 11 acquires, as part of the print data, code information that is information for printing a code image 30 and contains at least one attribute data set including an identifier and a parameter. A storage unit 15 associates and stores the identifier to style information and a condition for determining whether to apply the style. An attribute data set extraction unit 12 extracts from the code information the attribute data set containing an identifier stored in the storage unit 15. A condition evaluation unit 13 determines if the parameter contained in the extracted attribute data set satisfies the condition associated in the storage unit 15 to the identifier contained in the attribute data set. When the parameter is determined to satisfy the condition, a print command unit 19 applies a print command to the printer based on the style information associated to the identifier.

20 Claims, 10 Drawing Sheets

<PRINTING TABLE>

| IDENTIFIER | DATA ITEM | PRINTING INFORMATION |
|---|---|---|
| 010 | ITEM IDENTIFICATION NUMBER | PRINT PARAMETER AT POSITION **** FOLLOWING THE TEXT "ITEM ID:" |
| 011 | EXPIRATION DATE | PRINT PARAMETER AT POSITION **** (FORMAT: YY.MM.DD) FOLLOWING THE TEXT "EXPIRES ON:" |
| 015 | DATE PROCESSED | PRINT PARAMETER AT POSITION **** (FORMAT: YY.MM.DD) FOLLOWING THE TEXT "MADE ON:" |
| 030 | WEIGHT | PRINT PARAMETER AT POSITION **** (FORMAT: **** G) FOLLOWING THE TEXT "WEIGHT:" |
| 045 | PRICE | PRINT PARAMETER AT POSITION ** (FORMAT: *,*,* YEN) FOLLOWING THE TEXT "PRICE:" |
| 045 | PRICE | PRINT PARAMETER AT POSITION ** (FORMAT: *,*,* YEN) IN BOLD WITH BLUE BORDER |

FIG. 3

<STYLE TABLE>

| IDENTIFIER | DATA ITEM | CONDITION | STYLE INFORMATION |
|---|---|---|---|
| 001 | PRODUCT CODE | PRODUCT IS SALE ITEM. | PRINT SALE LOGO AT POSITION ****. |
| 001 | PRODUCT CODE | PRODUCT IS PRIME BEEF. | CHANGE TO RED LABEL BORDER (BOLD). |
| 010 | ITEM ID NUMBER | POINTS TO PRIME BEEF. | PRINT PICTURE OF COW AT POSITION ****. |
| 011 | EXPIRATION DATE | DAYS TO EXPIRATION IS 7 OR LESS. | PRINT PARAMETER IN UNDERLINED BOLD RED LETTERS. |

FIG. 4

PRINTING CONTROL DEVICE, PRINTER DRIVER, CONVERSION DEVICE, PRINTER, PRINTING SYSTEM, CONTROL METHOD FOR A PRINTING CONTROL DEVICE, AND CONTROL METHOD FOR A PRINTER

RELATED APPLICATIONS

The present application is based on, and claims priority from, Japanese Application Numbers 2009-191726, filed Aug. 21, 2009, 2010-114025, filed May 18, 2010, and 2010-114026, filed May 18, 2010, the disclosures of which are hereby incorporated by reference herein in their entirety.

BACKGROUND

1. Technical Field

The present disclosure relates to a printing control device for controlling a printer that prints code images, and to a printer driver, a conversion device, a printer, a printing system, a control method for a printing control device, and a control method for a printer.

2. Related Art

Code images (code symbols) such as a barcode are used in the retail and distribution industries as an effective means of identifying people and goods. With information being used in more ways and identification information becoming more complex, the amount of information contained in such code images is on the rise. While computers and other information processing devices can handle such large amounts of information easily, the people that handle and use such goods (referred to as the "user" below) cannot easily read and know the information contained in a particular code image, and when cautionary information about the handling of a product or good is contained in the code image, conveying this information accurately to the user is difficult.

Japanese Unexamined Patent Appl. Pub. JP-A-2003-182160 therefore teaches technology for printing for a attribute data (an essential text string) contained in the barcode data that is needed by the user in a format that is different from the other information (an added text string). This has the advantage of enabling the user to accurately and quickly read the essential text string.

In practical everyday use, however, the user does not always need the same attribute data. For example, attribute data such as the expiration date printed on a label affixed to products in a supermarket is extremely important in the case of fresh foods and prepared foods, but is not as important with dried goods and other products with a long shelf life. More specifically, the degree of importance of the same attribute data varies according to other conditions such as what the actual product is and the date or time of sale. The literature is silent, however, regarding conditionally changing the printing format of attribute data contained in a code image.

SUMMARY

A printing control device for controlling a printer that prints code images, and to a printer driver, a conversion device, a printer, a printing system, a control method for a printing control device, and a control method for a printer according to the present invention can change the printing format of the same attribute data based on whether or not a condition is satisfied so that information can be easily read by the user.

In some embodiments, a printing control device for controlling a printer that prints a code image includes a code information acquisition unit that acquires code information, which is information for printing the code image and contains at least one attribute data set including an identifier and a parameter added to the identifier; a storage unit that associates and stores the identifier, style information for printing with a style applied to a specific print element, and a condition for determining based on the parameter whether to apply the style; an attribute data set extraction unit that extracts from the acquired code information the attribute data set containing the identifier stored in the storage unit; a condition evaluation unit that determines if the parameter contained in the extracted attribute data set satisfies the condition associated in the storage unit to the identifier contained in the attribute data set; and a print command unit that, when the condition evaluation unit determines that the parameter satisfies the condition, applies a print command to the printer based on the style information associated to the identifier.

In some embodiments, a control method of a printing control device for controlling a printer that prints a code image, including: acquiring code information, which is information for printing the code image and contains at least one attribute data set including an identifier and a parameter added to the identifier; searching a storage unit that stores the identifier associated to style information for printing with a style applied to a specific print element and a condition for determining based on the parameter whether to apply the style, and extracting from the acquired code information the attribute data set containing the identifier stored in the storage unit; determining if the parameter contained in the extracted attribute data set satisfies the condition associated in the storage unit to the identifier contained in the attribute data set; and applying a print command to the printer based on the style information associated to the identifier when the parameter is determined to satisfy the condition.

When the parameter contained in the attribute data set is determined to satisfy the condition related to an identifier contained in the attribute data set in the storage unit, in some embodiments, a print command that applies styling based on the condition and the style information associated to the identifier is issued, and can therefore change the print format according to the parameter content. As a result, because the print format can be changed according to the importance of the printed content, for example, the user can quickly and accurately know the important information. In addition, because the styling is applied by the printing control device, the invention can be employed by simply adding or changing the printing control device, and such significant changes as replacing the printer or modifying the host device (such as a software application executed by a computer) that generates the code image are therefore not necessary. Updating the computer or the printer is also not impeded.

In a printing control device according to at least one embodiment, the print command unit commands printing the specific print element to which a style is applied based on the style information associated to the identifier, and the code image based on the code information acquired by the code information acquisition unit.

Some embodiments enable printing a specific print element to which styling is applied based on the style information together with the code image based on the code information.

In a printing control device according to at least one embodiment, the specific print element denotes a parameter added to the identifier.

Some embodiments can apply styling based on the style information to the parameter that is associated to the style information containing the specific print element. For example, if the identifier identifies a product code, styling can be applied to the code supplied as the parameter.

In a printing control device according to at least one embodiment, the print command unit commands printing with text corresponding to the identifier added to the parameter.

Some embodiments can print text corresponding to the identifier together with the parameter to which styling is applied based on the style information. For example, if the identifier denotes a product code, text (such as "Product code: ") corresponding to the identifier can be added and printed at the beginning of the code supplied as the parameter.

Further, in a printing control device according to at least one embodiment, the identifier indicates a product code; and the condition evaluation unit determines that the condition is satisfied when a product identified by the parameter is determined to be an advertised product as a result of searching a product database.

Because the condition in this exemplary embodiment is that the product identified by the parameter is an advertised product, applying a style to a specific print element can be restricted to only when code information for an advertised product is acquired. As a result, styling such as adding a logo indicating an "advertised special," for example, can be applied to the labels that are printed for advertised products.

Further, in a printing control device according to at least one embodiment, the identifier denotes an expiration date; and the condition evaluation unit determines that the condition is satisfied when a number of days left to a date identified by the parameter is less than or equal to a specified number of days based on a time kept by a clock unit.

Because the condition in this exemplary embodiment is that the number of days left to the date identified by the parameter is less than or equal to a specified number of days, applying a style to a specific print element can be restricted to only when code information for a product that is approaching the expiration date is acquired. As a result, styling such as printing the date (parameter) in bold type can be applied to the labels that are printed for products that are near the expiration date.

Yet further, in a printing control device according to at least one embodiment, the style information includes information relating to one or more of character size, character style, underlining, ruled line, border, text effect, text color, line color, background color, character font, image addition, and printing position.

Some embodiments enable applying style attributes affecting character size (font size), character style (such as italic or bold), underlining, ruled lines, borders, text effects (such as strikethrough, outline, shadow, and hidden text), text color, line color, background color, character type (font type), image addition, and printing position (specifying an absolute position on the product label L or a relative position referenced to other information).

In some embodiments, a printer driver that functions as the printing control device described above is installed in a computer that produces the code information.

Because the printer driver applies styling in this exemplary embodiment, the invention can be achieved by simply changing the printer driver and does not require significant changes such as replacing the printer or changing the computer (changing the software application) that generates the code image.

In some embodiments, a conversion device that functions as the printing control device described above is connected to a computer that produces code information and a printer.

Because a conversion device that is connected to the printer applies styling in this exemplary embodiment, the invention can be achieved by simply adding the conversion device and does not require significant changes such as replacing the printer or changing the computer (changing the software application) that outputs the code image.

In some embodiments, a printer that prints based on code information for printing a code image is disclosed, the code information containing at least one attribute data set, each attribute data set including an identifier for identifying the attribute data set and a parameter added to the identifier. The printer including: a code information acquisition unit that acquires the code information; a storage unit that links and stores the identifier, style information for printing with a style applied to a specific print element, and a condition for determining based on the parameter whether to apply the style; an attribute data set extraction unit that extracts from the acquired code information the attribute data set containing the identifier stored in the storage unit; a condition evaluation unit that determines if the parameter contained in the extracted attribute data set satisfies the condition associated in the storage unit to the identifier contained in the attribute data set; and a print unit that, when the condition evaluation unit determines that the parameter satisfies the condition, prints based on the style information associated to the identifier.

In some embodiments, a control method of a printer that prints a code image, including: acquiring code information, which is information for printing the code image and contains at least one attribute data set including an identifier and a parameter added to the identifier; searching a storage unit that stores the identifier associated to style information for printing with a style applied to a specific print element and a condition for determining based on the parameter whether to apply the style, and extracting from the acquired code information the attribute data set containing the identifier stored in the storage unit; determining if the parameter contained in the extracted attribute data set satisfies the condition associated in the storage unit to the identifier contained in the attribute data set; and printing based on the style information associated to the identifier when the parameter is determined to satisfy the condition.

Because these aspects of the invention print based on style information related to an identifier and condition only when a parameter contained in an attribute data set is determined to satisfy the condition related to the identifier contained in the attribute data set in the storage unit, these aspects of the invention can change the print format according to the parameter content.

Furthermore, because styling is applied in the printer, acquiring style information from a computer (host device) is not necessary. Because the amount of data that is transferred is thus reduced compared with a configuration in which style information is acquired from a computer, network traffic efficiency can be improved.

Yet further, because a styling process is not required on the computer side, the control load of the computer can be reduced and style specification errors can be eliminated.

In some embodiments, a printing system printing system including a computer in which the printer driver described above is installed and which generates print data containing the code information and sends the print data to the printer; and the printer.

A printing system according to some embodiments includes the conversion device described above, a computer that generates print data containing a code information and sends the print data to the conversion device; and a printer.

A printing system according to some embodiments includes the printer described above, and a computer that generates print data containing a code information and sends the print data to the printer.

These aspects of the invention can render a printing system that enables a user to easily acquire information by changing the format used to print the same attribute data based on whether or not a particular condition is satisfied.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows an example of a printing table.

FIG. 4 shows an example of a style table.

DESCRIPTION OF EMBODIMENTS

Embodiment 1

Figure 1:
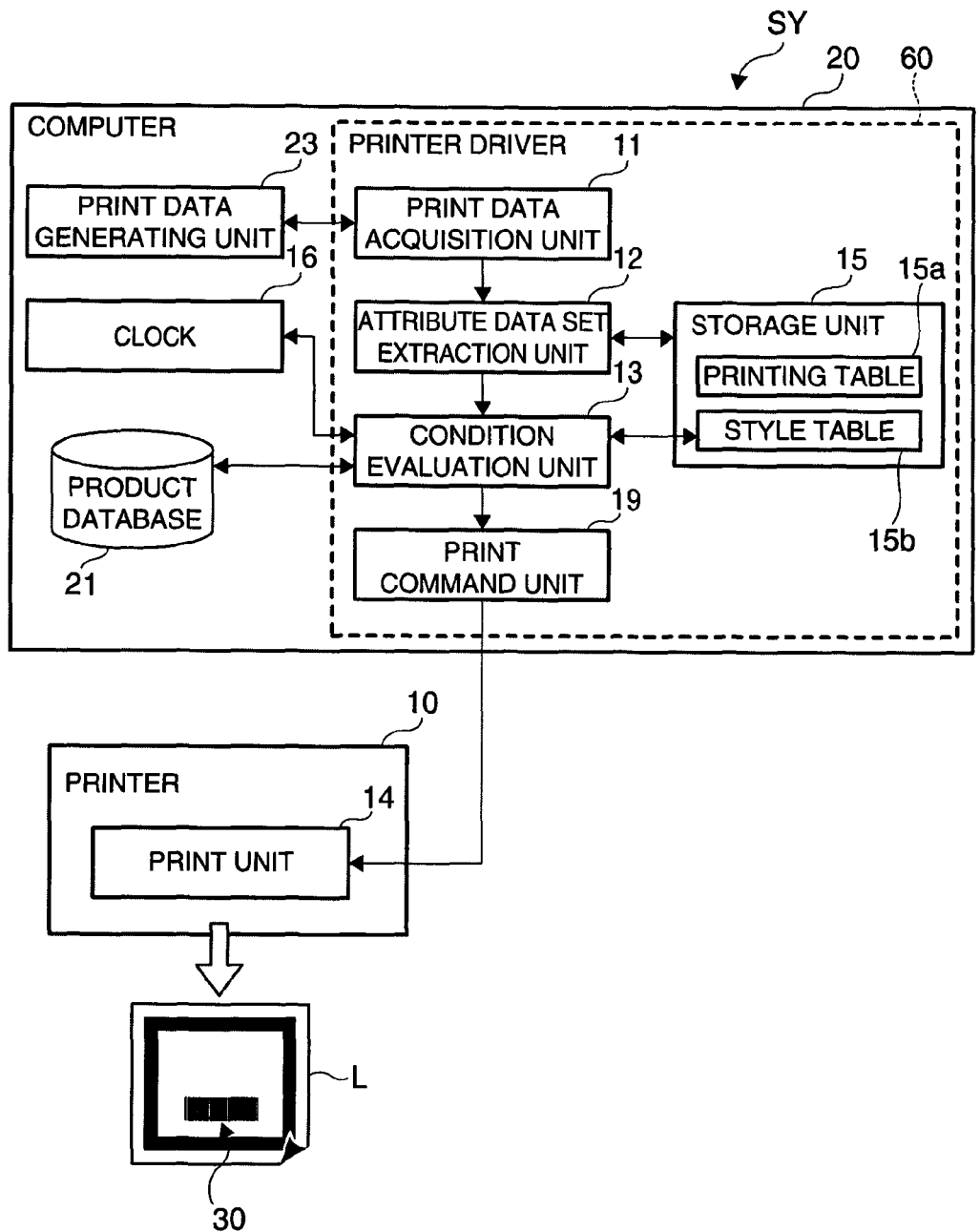
FIG. 1 is a block diagram showing the configuration of a printing system according to the first exemplary embodiment.

FIG. 1 is a block diagram showing the configuration of a printing system SY according to the first exemplary embodiment. This printing system SY includes a printer 10 and a computer 20 that sends print data 40 (see FIG. 5A) to the printer 10.

In at least one embodiment, the computer 20 generates and transmit code information 42 (see FIG. 2A) for printing at least a code image 30, and can be rendered using a POS (point-of-sale) terminal, personal computer, or other information processing device. Note that while a barcode is shown in FIG. 1 as an example of a code image 30, a two-dimensional barcode, a color code, or other type of code symbol may be used.

The computer 20 has a product database 21. The product database 21 stores information such as the product code, item identification number, product name, price, discount rate, and/or product attributes (such as an advertised sale product or a limited-time offer) for each product. Note that the product database 21 does not need to be positioned in the computer 20, and may be disposed separately in the printing system SY. In some embodiments, the product database 21 may also be stored in a POS server not shown.

The computer 20 also has a printer driver 60 (printing control device). The printer driver 60 controls the printer 10, and is installed in the computer 20.

As shown in FIG. 1, the main functional components of the computer 20 (host side) are a print data generating unit 23 and a clock unit 16. The print data generating unit 23 generates print data 40 for printing a product label L. In at least one embodiment, the print data generating unit 23 is rendered by a software application executed by the computer 20 that can generate the code information 42. For example, when the computer 20 is a POS terminal, the print data generating unit 23 is rendered by the POS application.

In some embodiments, the clock 16 is rendered by a real-time clock (RTC), for example, and keeps the current time. In some other embodiments, the current time may alternatively be determined by acquiring time information from an external device not shown instead of rendering a clock 16 in the computer 20.

The printer driver 60 is configured to communicate and/or control the printer 10, which includes a print data acquisition unit 11 (code information acquisition unit), an attribute data set extraction unit 12, a condition evaluation unit 13, a print command unit 19, and a storage unit 15.

Figure 5A:
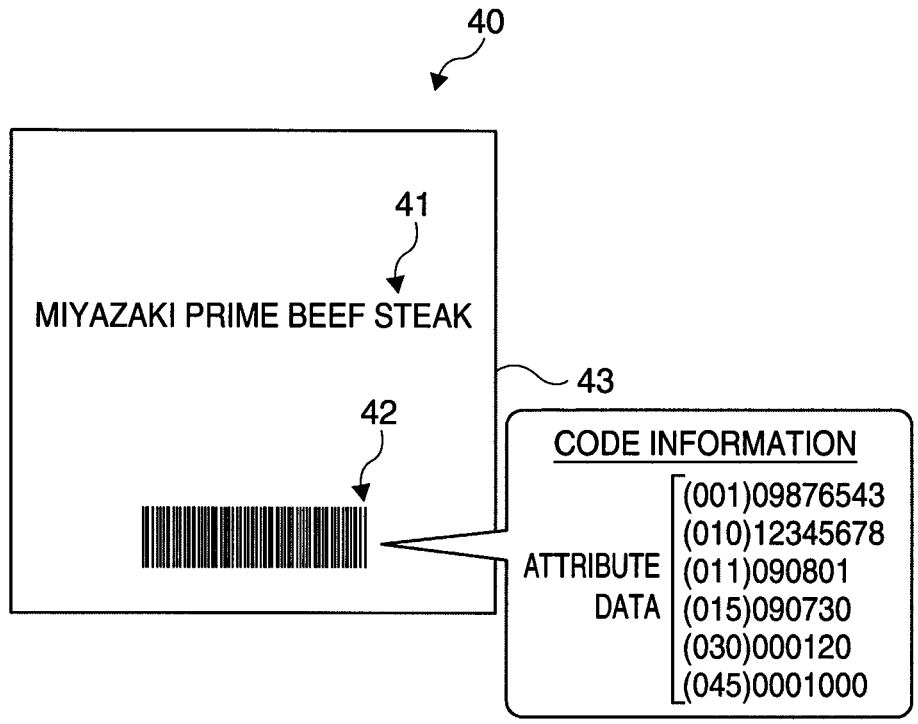
FIG. 5 shows an example of print data input to the printer driver, and the printout of a product label based on the print data.
Figure 5B:
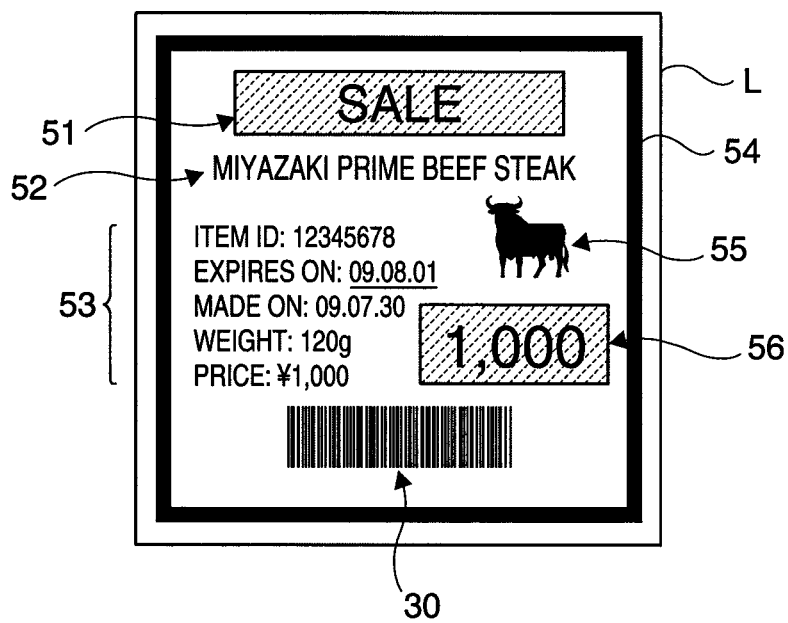

The print data acquisition unit 11 acquires the print data 40 from the print data generating unit 23. Included in the print data 40 are text information 41 for printing text such as the product name and code information 42 for printing a code image 30 on a product label L, and border information 43 for printing a border 54 around the product label L as shown in FIG. 5A and FIG. 5B.

Figures 2A, 2B:
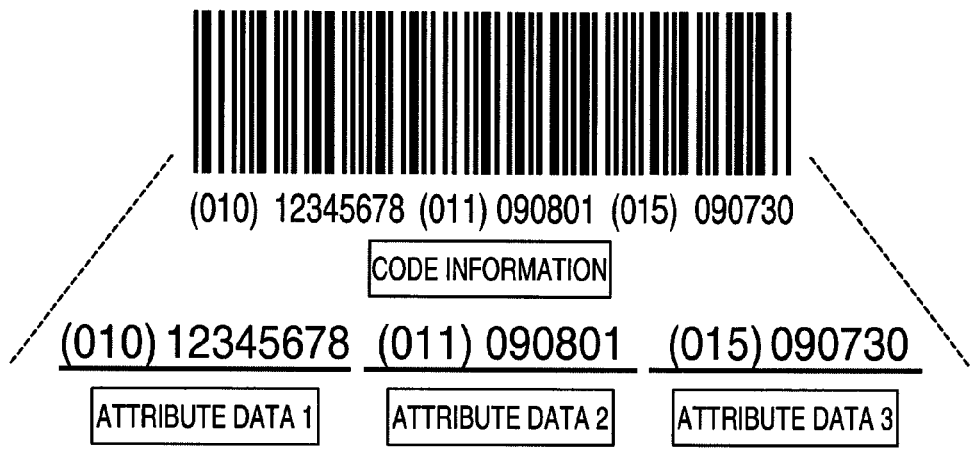
FIG. 2 describes code information for printing a code image.

The code information 42 is described next with reference to FIG. 2. FIG. 2A shows an example of the code information 42. As described above, the code information 42 is information for printing a code image 30 and includes one or more attributes. FIG. 2A shows an example in which the code information 42 contains three attribute data records (referred to herein as "attribute data sets").

As shown in FIG. 2, the attribute data includes an identifier for identifying an attribute data set, and at least one parameter associated with the identifier. In this example the identifier is a three digit value enclosed in parentheses. In some embodiments, the parameter is a six to eight digit number. Note that a GS1 Data Bar may be used as the code image 30, in which case GS1 Application Identifiers can be used as the identifier. In this embodiment of the invention, however, the identifier and data items are defined independently of the GS1 Application Identifier standard (ISO/IEC 15418).

Referring again to FIG. 1, in some embodiments, the storage unit 15 is a nonvolatile storage device such as flash memory, and stores a printing table 15a (see FIG. 3) and style table 15b (see FIG. 4).

The printing table 15a stores at least one identifier, the data item identified by the identifier, and printing information describing the corresponding editing rules. The style table 15b stores at least one identifier, the data item identified by the identifier, a condition for determining whether to apply styling, and style information describing the corresponding editing rules. The editing rules, also referred to as the editing content, is described further below.

The attribute data set extraction unit 12 extracts the attribute data set containing the identifier stored in the storage unit 15 (either in the printing table 15a or the style table 15b) from the code information 42 in the print data 40 acquired by the print data acquisition unit 11. For example, if code information 42 containing the attribute data set with the identifier 010 (data item: item identification number) is acquired, the attribute data set with the identifier 010 is extracted from the acquired code information 42 because the same identifier is stored in both the printing table 15a and style table 15b (as indicated by arrow A in FIG. 3 and arrow B in FIG. 4).

The condition evaluation unit 13 references the style table 15b and determines if the parameter contained in the attribute data set extracted by the attribute data set extraction unit 12 satisfies the condition associated to the identifier contained in the attribute data. For example, when code information 42 containing attribute data with the identifier 010 is acquired, the condition associated to that identifier (indicated by arrow B) in the style table 15b is that "the product is prime Japanese beef," and the condition evaluation unit 13 therefore determines if the parameter following the identifier 010 indicates prime beef.

In at least one embodiment, if the condition is that "the product identified by the parameter is an advertised item" or other content requiring product identification, the condition evaluation unit 13 references the product database 21 to decide.

In at least one embodiment, if the condition is that "the number of days left to the date identified by the parameter is within a specified number of days" or other condition requiring knowing the date, the condition evaluation unit 13 references the output of the clock 16 to decide.

The print command unit 19 applies the styling to the acquired print data 40, applies a specific data conversion suitable to the printer 10, and applies a print command to the printer 10. For example, if the condition evaluation unit 13 decides that the parameter satisfies the condition, styling is applied based on the style information associated to the identifier and a print command is then output to the printer 10.

For example, if code information 42 containing the attribute data set of identifier 010 is acquired and the parameter following the identifier 010 indicates prime beef, the print command unit 19 edits the print data 40 (applies style attributes) according to the style information associated to the identifier, which in this example says to "print a picture of a cow at position **" as indicated by arrow B. If the condition evaluation unit 13 determines that the parameter does not satisfy the condition, styling based on the style table 15b** is not applied.

When the attribute data set extraction unit 12 extracts an attribute data set containing the identifier stored in the printing table 15a, the print command unit 19 asserts a print command based on the printing information associated to the identifier. For example, when code information 42 containing attribute data with the identifier 010 is acquired, the print command unit 19 edits the print data 40 (adds text data) according to the printing information (print the parameter at position **** following the text "ITEM ID:") (indicated by arrow A) associated to that identifier.

The printer 10 prints the code image 30 based on the code information 42 contained in the print data 40, and in this embodiment is a color label printer for creating color product labels L that may be applied to fresh foods and vegetables, for example. Further, in some embodiments, the printer 10 may be connected to the computer 20 by wire or wirelessly.

The printer 10 further comprises a print unit 14. The print unit 14 can be rendered by a print head, a head drive mechanism, a label media transportation mechanism, and a label cutting mechanism. The print unit 14 may use various methods of printing, including inkjet printing and/or thermal printing.

Referring next to FIG. 5, the print data 40 that is input to the printer driver 60 (output from the software application) and the printout of a product label L based on this print data 40 are described below. FIG. 5A schematically shows an example of the print data 40. This example of print data 40 includes text information 41 indicating the product name, code information 42, and border information 43. In some embodiments, the print data 40 also comprises information about the printing position and size of the information 41 to 43, and the font and color of the text information 41. The six attribute data sets shown in the figure are also included in the code information 42 in this example.

FIG. 5B shows the printout of a product label L based on the print data 40 shown in FIG. 5A. As shown in the figure, a top logo 51 declaring an advertised item, the product name 52, product details 53, border 54, an illustration 55, product price 56, and the code image 30 are printed on the label. In some embodiments, the product name 52, border 54, and code image 30 are items that are printed based on the text information 41, border information 43, and code information 42, respectively, in the print data 40.

Figure 6:
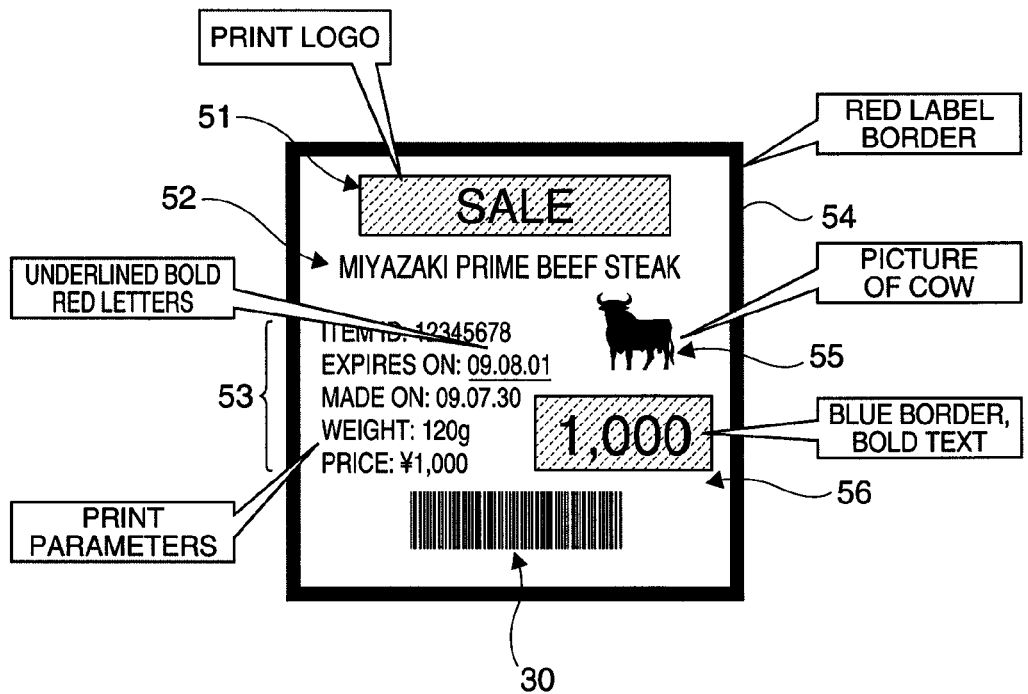
FIG. 6 shows an example of edited content in the product label.

The correlation between the printing table 15a (see FIG. 3) and style table 15b (see FIG. 4) and the product label L that is printed is described next with reference to FIG. 6.

As shown in FIG. 5A, the identifier 001 (data item: product code) is contained in the print data 40 (code information 42), and the identifier 001 is stored in the style table 15b.

The condition evaluation unit 13 therefore references the product database 21, and determines if the product identified by the parameter following the identifier satisfies the condition "is an advertised item" associated to the same identifier. If the condition is satisfied, a top logo 51 is printed based on the style information associated to the identifier. Further, in at least one embodiment, if the condition is not satisfied (the product is not an advertised item), the top logo 51 is not printed. Note that a logo as used herein is image data in a specific format, and the color and size are specified by the image data of the logo.

The condition evaluation unit 13 then references the product database 21 and determines if the product identified by the parameter following the identifier satisfies the condition associated to the identifier, specifically, that the product is "prime beef" in this example. If the condition is satisfied, the label border 54 is changed and printed based on the style information associated to the identifier. Further, in at least one embodiment, if the condition is not satisfied (the product is not prime beef in this example), a predefined label border based on the border information 43 is printed.

As shown in FIG. 4, editing rules related to various style attributes are described in the style information. Examples of such style attributes include character size (font size), character style (such as italic or bold), underlining, ruled lines, borders, text effects (such as strikethrough, outline, shadow, and hidden text), text color, line color, background color, character type (font type), image addition, and printing position (specifying an absolute position on the product label L or a relative position referenced to other information). In some embodiments, the specific print elements (such as the insertion area of the top logo 51 or other logo or illustration 55, the parameter following the identifier, and the border 54) to which the styling is applied may also be described in the style information.

In at least one embodiment, the print data 40 shown in FIG. 5A also contains the identifier 010 (data item: item identification number). The identifier 010 is also stored in printing table 15a. Printing therefore proceeds based on the printing information associated to the identifier in the printing table 15a. In this embodiment, the first line of the product details 53 is printed based on the printing information associated to the identifier 010. As shown in FIG. 3, editing rules related to the printing position, text insertion, and styling (see the style information above) are described in the printing information.

Furthermore, because the identifier 010 is also stored in the style table 15b, the condition evaluation unit 13 references the product database 21 and determines if the product identified by the parameter following the identifier satisfies the condition associated to the identifier. If the result is that the condition is satisfied, an illustration 55 is printed based on the style information associated to the identifier.

The second line of the product details 53 is then printed based on the attribute data (see FIG. 5A) of the identifier 011 (data item: expiration date) contained in the print data 40. Because the identifier 011 is also stored in the style table 15*b*, according to at least one embodiment, the condition evaluation unit 13 references the time kept by the clock 16 and determines if the date identified by the parameter following the identifier satisfies the condition (for example, in some embodiments, that the number of days left to the expiration date is 7 or less) associated to the identifier. If the result is that the condition is satisfied, the expiration date parameter part is printed in underlined bold red text based on the style information associated to the identifier. In other words, the specific print element to which styling is applied in this situation is the parameter following the identifier.

The third line of the product details 53 is then similarly printed in this embodiment based on the attribute data of the identifier 015 (data item: date processed) contained in the print data 40, the fourth line of the product details 53 is printed based on the attribute data of the identifier 030 (data item: weight) contained in the print data 40, and the fifth line of the product details 53 and the product price 56 are printed based on the attribute data of the identifier 045 (data item: price) contained in the print data 40.

Note that the product details 53 are printed (that is, the parameters are printed as text) in each case by adding text corresponding to the particular identifier to the parameter following the identifier based on the result of referencing the printing table 15*a*.

Figure 7:
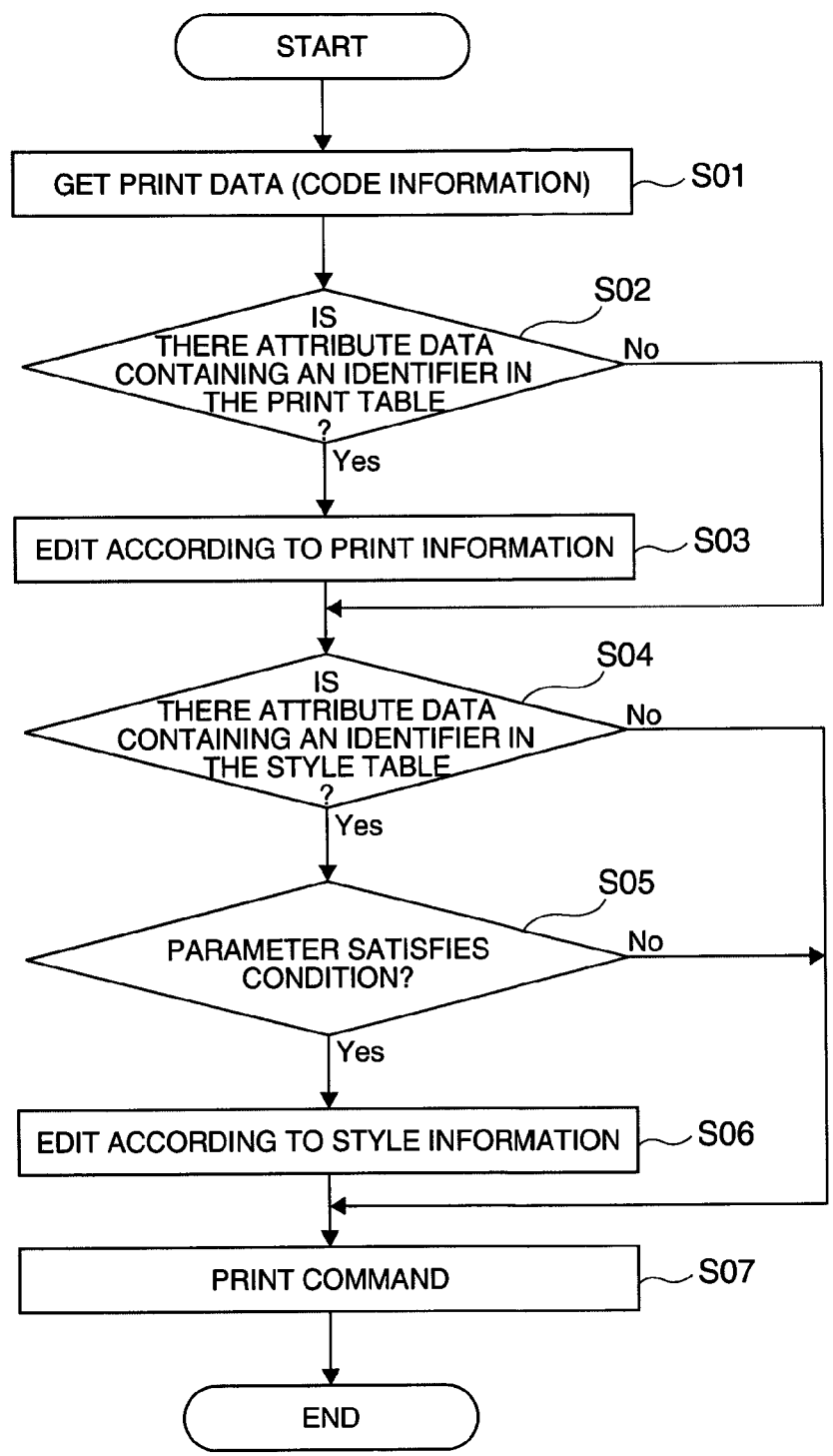
FIG. 7 is a flow chart showing the printer driver control method.

The control method of the printer driver 60 is described next referring to the flowchart in FIG. 7. In this embodiment the printing table 15*a* and style table 15*b* are predefined and stored in the storage unit 15.

When the printer driver 60 acquires the print data 40 (code information 42) by means of the print data acquisition unit 11 (S01), the attribute data set extraction unit 12 determines whether or not attribute data contained in the acquired code information 42 having an identifier in the printing table 15*a* (S02).

If attribute data contained in the code information 42 have an identifier in the printing table 15*a* (S02 returns Yes), the print data is edited based on the printing information associated to the identifier (S03). If attribute data contained in the code information 42 do not have an identifier in the printing table 15*a* (S02 returns No), step S03 is skipped. In some embodiments, S02-S03 may be performed in an iteration manner until all identifiers contained in the code information 42 are checked.

The printer driver 60 then determines by means of the attribute data set extraction unit 12 if the attribute data contained in the acquired code information 42 having an identifier in the style table 15*b* (S04). If attribute data contained in the code information 42 have an identifier in the style table 15*b* (S04 returns Yes), the condition evaluation unit 13 determines if the parameter following the identifier satisfies the condition described in the style table 15*b* (S05).

If the condition evaluation unit 13 decides that the parameter following the identifier satisfies the condition (S05 returns Yes), editing for printing is applied based on the style information described in the style table 15*b* (S06).

If attribute data contained in the code information 42 do not have an identifier in the style table 15*b* (S04 returns No), steps S05 and S06 are skipped, and if the parameter following the identifier does not satisfy the condition (S05 returns No), step S06 is skipped. The print command unit 19 then applies a print command to the printer 10 (S07) based on the result of editing in step S03 and S06. Note that if editing is not applied, the acquired print data 40 is printed without editing. In some embodiments, S04-S06 may be performed in an iteration manner until all identifiers contained in the code information 42 are checked.

When selected attribute data contained in the code information 42 included in the print data 40 sent from a software application on the computer 20 is determined to satisfy a specific condition defined in the style table 15*b* of the printing system SY according to the exemplary embodiment described above, the printer driver 60 asserts a print command based on the condition and style information associated to the identifier, and can thereby change the printing format according to the content of the attribute data, for example. As a result, because the print format is changed for printing according to the importance of the printed content, for example, the user can accurately and quickly know the important information.

In addition, because styling is applied by the printer driver 60, the print format can be changed without the need for great change, such as modifying the software application of the computer 20 that generates the code information 42 or replacing the printer 10. The computer 20 and printer 10 can also be upgraded freely.

Furthermore, because a printing table 15*a* in which printing information (editing rules) is set for individual identifiers is stored in the printer driver 60 in addition to the style table 15*b*, the same styling can also be uniformly applied to specific attribute data regardless of whether or not a condition is satisfied.

While a code image 30 is printed on a product label L in the embodiment described above (see FIG. 5B), in some other embodiments, it is not necessary to print the code image 30. More specifically, when code information 42 is contained in the print data 40, printing a code image 30 based on the code information 42 can also be omitted. In some embodiments, the printing system SY may comprise a configuration in which the user can set whether or not printing the code image 30 is necessary.

Furthermore, information such as the printing position and size of the text information 41, code information 42, and border information 43, and the font and color of the text information 41, is contained in the print data 40 in the embodiment described above. In some other embodiments, the information related to the printing position, size, font, and color may be stored in the printing table 15*a* in the printer driver 60. More specifically, in some embodiments, the printing system SY may comprise a configuration in which the software application of the computer 20 sends only the content of information 41, 42, and 43, and the printing position, size, and other attributes are determined based on the printing information in the printing table 15*a*. Because the software application does not need to send such information as the printing position and size in this configuration, intricate, attractive product labels L can be created even when a simple software application is used.

When printing a border 54, the foregoing embodiment describes changing the border based on the border information 43 contained in the print data 40 to a border based on the style information, but styling that adds a specific border may be applied when border information 43 is not contained in the print data 40, in accordance with some embodiments. More specifically, a style that adds and prints a specific border may also be defined.

Furthermore, when the date identified by the parameter following the identifier 011 (data item: expiration date) satisfies the condition that "the number of days left to expiration is 7 or less," the embodiment described above prints that parameter in bold type. However, in some embodiments, depending upon the product, situations in which the expiration date is always important regardless of how many days remain to the expiration date. As a result, when the product code identifies a product, such as fresh or prepared foods for example, for which the expiration date is important, the expiration date parameter part may be printed with styling applied. In the style table 15b in this configuration, an identifier points to the product code with the associated condition being that the product is fresh or prepared food, and the associated style information specifies printing the expiration date parameter (the parameter following the identifier 011) bold. This configuration enables an even wider range of styling because a specific print element is defined by a parameter following a specific identifier.

Embodiment 2

A second embodiment of the invention is described next with reference to FIG. 8.

The printer driver 60 applies styling in the first embodiment described above. In some embodiments in accordance with the configuration depicted in FIG. 8, a conversion device 70, which is connected to the computer 20 and the printer 10, handles styling. The differences between this and the first embodiment are described below.

Note that like parts in this and the first embodiment are identified by the same reference numerals, and further detailed description thereof is omitted. In addition, modifications of the first embodiment described above can also be applied to the like parts in this embodiment.

Figure 8:
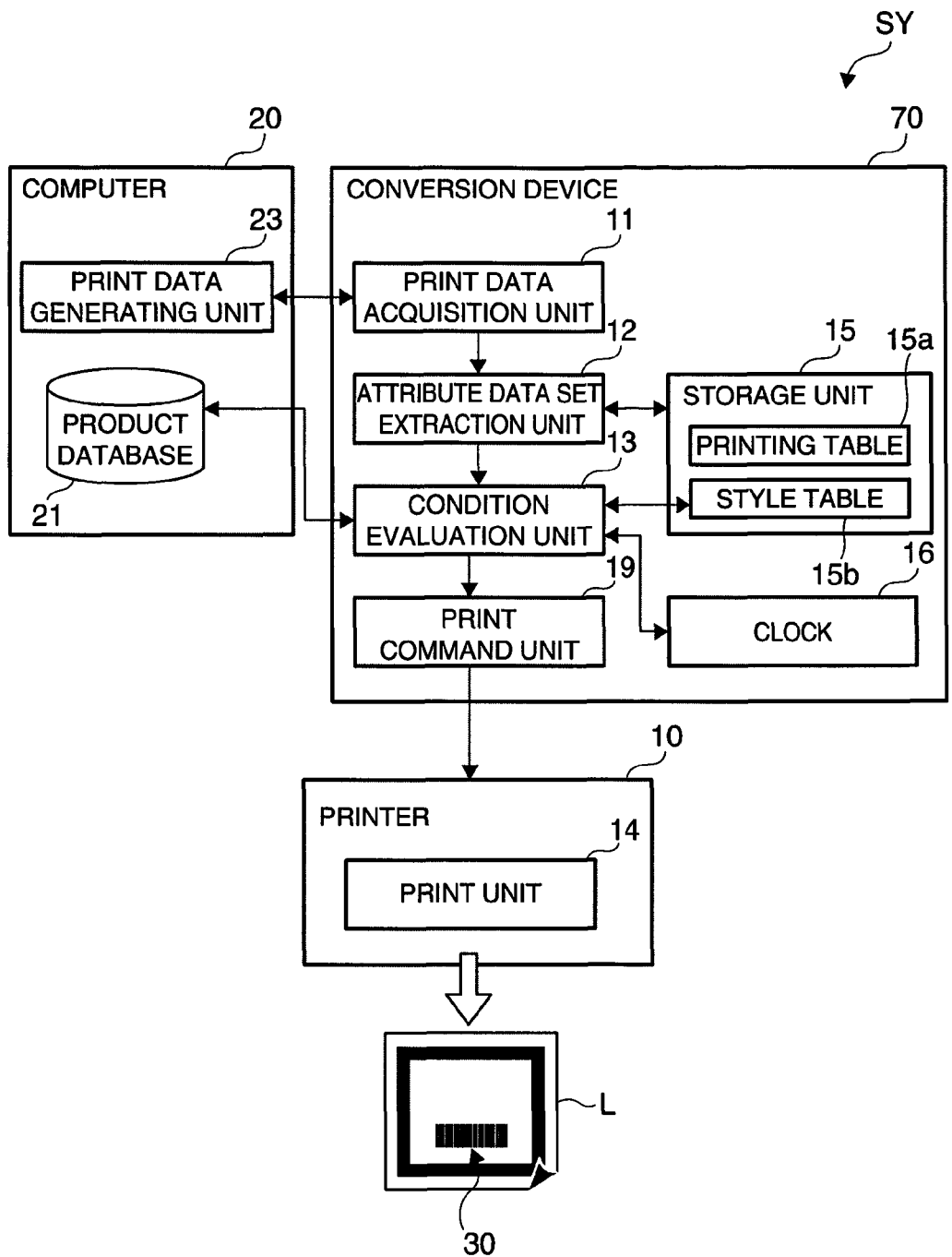
FIG. 8 is a block diagram showing the configuration of a printing system according to a second exemplary embodiment.

FIG. 8 is a block diagram showing the configuration of the printing system SY according to a second exemplary embodiment.

The printing system SY according to this embodiment of the invention has a computer 20 that generates and outputs print data 40, a conversion device 70 (printing control device) that applies a specific data conversion (such as styling) to the print data 40 sent from the computer 20, and a printer 10 that prints based on a print command from the conversion device 70.

Note also that the product database 21 is rendered in the computer 20 in this example, but may be rendered in the conversion device 70 in some other embodiments. The product database 21 may also be stored in a POS server not shown and referenced from the conversion device 70.

The conversion device 70 is a device that renders the main parts of this embodiment, and is connected to the computer 20 and printer 10 through an interface (not shown in the figure). In some embodiments, further, that the conversion device 70 may be connected by wire, wireless LAN, or other wireless connection to the computer 20 and printer 10.

In some embodiments, the conversion device 70 includes print data acquisition unit 11 (code information acquisition unit), attribute data set extraction unit 12, condition evaluation unit 13, print command unit 19, storage unit 15, and clock 16. The attribute data set extraction unit 12, condition evaluation unit 13, and print command unit 19 are rendered by a control device in the conversion device 70, and the control device, in some embodiments, includes a CPU (central processing unit), ROM (read-only memory), and RAM (random access memory).

The print data acquisition unit 11 acquires print data 40 through the interface from the print data generating unit 23 of the computer 20. Furthermore, instead of rendering a clock 16 in the conversion device 70, the conversion device 70 may determine the current time by acquiring time information from the computer 20 or an external device.

Other aspects of part functions are the same or similar as in the first exemplary embodiment depicted in FIG. 1. The method of controlling the conversion device 70 is also the same or similar as described in the steps in FIG. 7, and further detailed description thereof is thus omitted.

As described above, because the conversion device 70 disposed between the computer 20 and the printer 10 in the printing system SY according to the second exemplary embodiment applies styling, the invention can be used by simply adding the conversion device 70 and does not require changing the system greatly, such as by modifying the software application of the computer 20 that outputs the code information 42 or replacing the printer 10.

Figure 9:
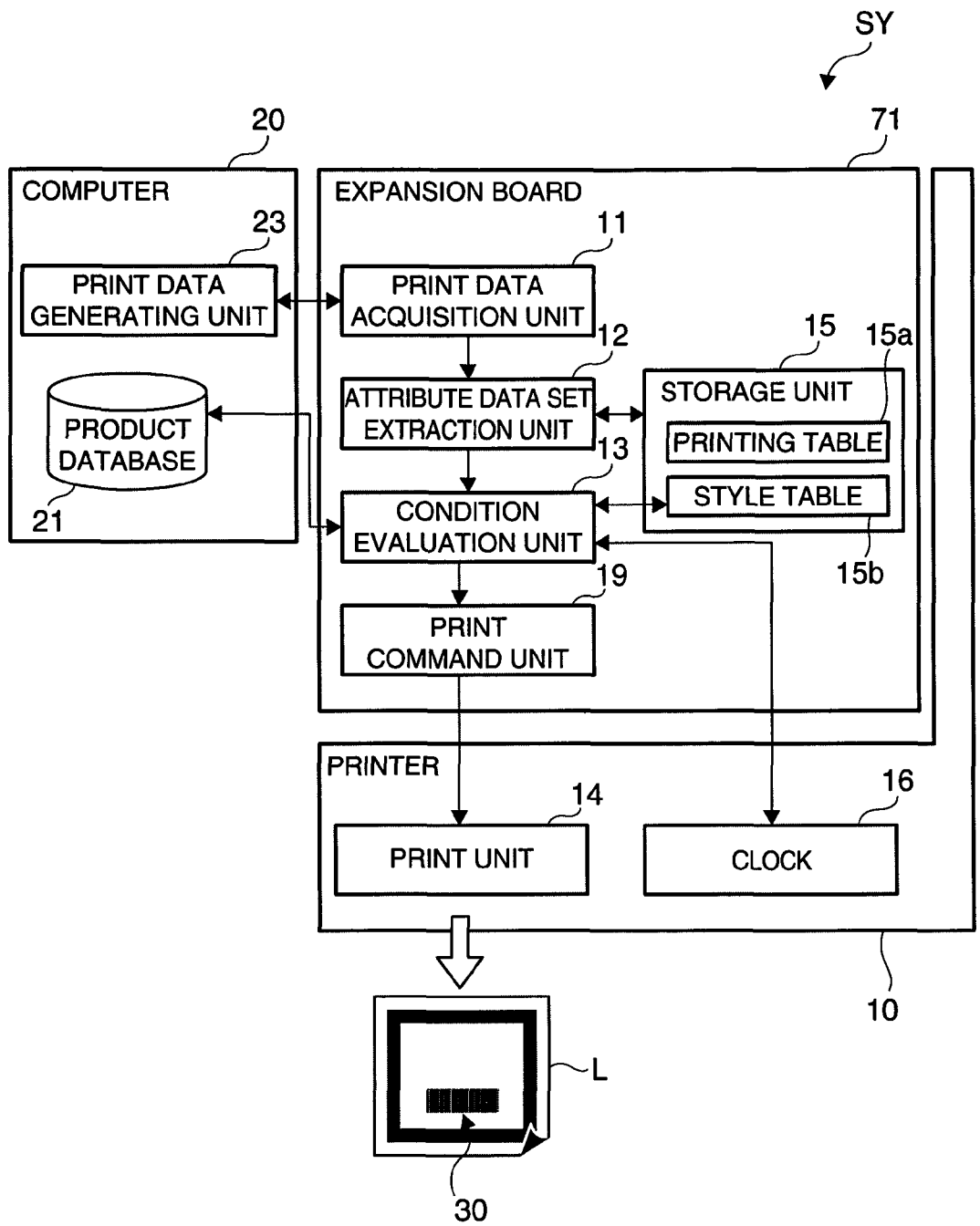
FIG. 9 is a block diagram showing the configuration of a printing system according to a variation of the second exemplary embodiment.

In this second exemplary embodiment, the conversion device 70 is an independent device that is connected to the computer 20 and printer 10 through an interface and cable, for example, but may also be rendered as an expansion board 71 that is used installed to the printer 10 as shown in FIG. 9. In this configuration, the print data acquisition unit 11 (code information acquisition unit), attribute data set extraction unit 12, condition evaluation unit 13, print command unit 19, and storage unit 15 are rendered on the expansion board 71.

In this configuration, the clock 16 may be rendered in the printer 10 as shown in the figure, or on the expansion board 71. In some embodiments, the expansion board 71 also has an external interface that connects to the computer 20 and/or a dedicated interface that connects to the printer 10 (neither interface shown in the figures), and communicates through these interfaces with the computer 20 and printer 10. Yet further, in some embodiments, a control device (not shown in the figure) independent of the printer 10 is also disposed to the expansion board 71, and various parts are achieved by this control device and a control program stored in the storage unit 15. By thus rendering the conversion device 70 as an expansion board 71, installation space requirements can be reduced. The system configuration is also simplified by constructing the printing system SY using a computer 20 and printer 10 with an installed expansion board 71.

Embodiment 3

A third exemplary embodiment is described next with reference to FIG. 10.

In this exemplary embodiment, the printer 10 handles styling. The differences between this and the foregoing embodiments are described below.

Note that like parts in this and the foregoing embodiments are identified by the same reference numerals, and further detailed description thereof is omitted. In addition, modifications of the foregoing embodiments described above can also be applied to the like parts in this embodiment.

Figure 10:
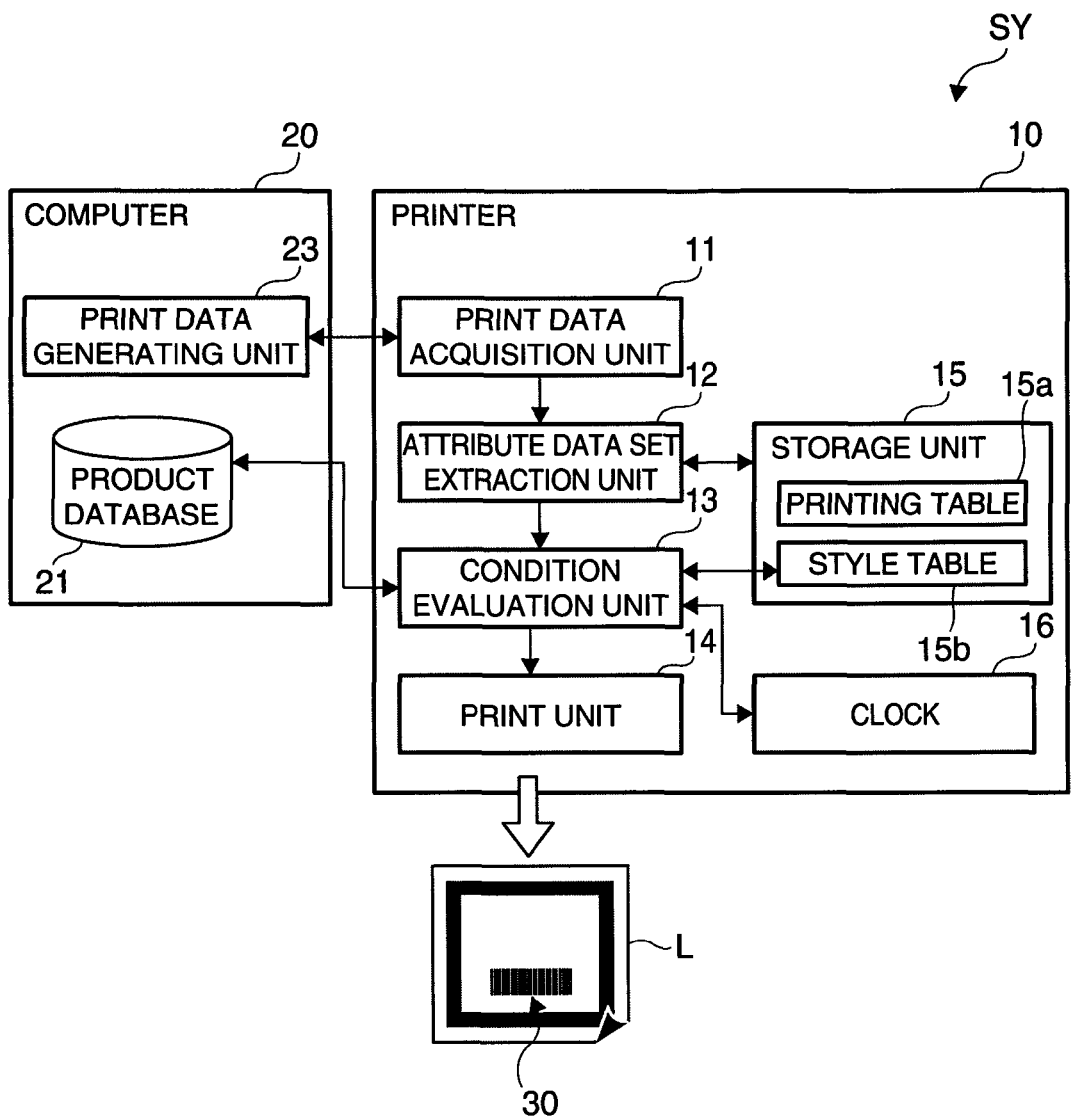
FIG. 10 is a block diagram showing the configuration of a printing system according to a third exemplary embodiment.

FIG. 10 is a block diagram showing the configuration of a printing system SY according to the third embodiment of the invention. The printing system SY in this embodiment includes a printer 10 and a computer 20 that sends print data 40 to the printer 10.

The printer 10 include a print data acquisition unit 11 (code information acquisition unit), attribute data set extraction unit 12, condition evaluation unit 13, print unit 14, storage unit 15, and clock 16. In some embodiments in accordance with the configuration depicted in FIG. 10, the attribute data set extraction unit 12 and condition evaluation unit 13 are rendered by a control device in the printer 10 of which the main parts are a CPU, ROM, and RAM.

The print data acquisition unit 11 acquires print data 40 from the computer 20, and is rendered by an interface (connector terminal or board, for example). The print unit 14 has the function of the print command unit 19 described in the foregoing embodiments.

Furthermore, instead of rendering a clock 16 in the printer 10, the printer 10 may determine the current time by acquiring time information from the computer 20 or an external device. Other aspects of part functions are the same or similar as in the first exemplary embodiment. The method of controlling the printer 10 is also the same or similar as described in the steps in FIG. 7 except that step S07 is simply "print." More specifically, in step S07 the print unit 14 prints based on the result of editing in S03 and S06.

With the printing system SY according to the third exemplary embodiment described above, the printer 10 prints based on the style information related to the condition and the identifier only when certain attribute data in the code information 42 contained in the print data 40 sent from the computer 20 is determined to satisfy a condition defined in the style table 15b. As a result, the print format can be changed according to the content of the attribute data. In addition, because styling is applied internally by the printer 10, there is no need to acquire style information from the computer 20. As a result, a style process is not required on the computer 20 side, style definition errors can be eliminated, and the amount of data that is sent to the printer 10 can be reduced.

In some embodiments, certain components of the printing system SY described in the foregoing embodiments can be rendered as a program. This program can also be provided stored on a recording medium such as CD-ROM or flash memory, for example. More specifically, a program that causes a common computer to function as the parts of the printer driver 60, conversion device 70, and printer 10 described above, and a recording medium recording such program, are also included in the scope of the disclosure.

Yet further, a label printer is used as an example of a printer 10 in the foregoing embodiments, but the embodiments can also be applied to other types of printers and ticket machines. Other modifications are also possible without departing from the scope of the accompanying claims.

The exemplary embodiments being thus described, it will be appreciated that it may be varied in many ways. Such variations are not to be regarded as a departure from the spirit and scope of the invention, and all such modifications as would be obvious to one skilled in the art are intended to be included within the scope of the following claims.

What is claimed is:

1. A printing control device for controlling a printer that prints a code image, comprising:
    a code information acquisition unit that acquires code information, which is information for printing the code image and contains at least one attribute data set including an identifier and a parameter added to the identifier;
    a storage unit that associates and stores the identifier, style information for printing with a style applied to a specific print element, and a condition for determining based on the parameter whether to apply the style;
    an attribute data set extraction unit that extracts from the acquired code information the attribute data set containing the identifier stored in the storage unit;
    a condition evaluation unit that determines if the parameter contained in the extracted attribute data set satisfies the condition associated in the storage unit to the identifier contained in the attribute data set; and
    a print command unit that, when the condition evaluation unit determines that the parameter satisfies the condition, applies a print command to the printer based on the style information associated to the identifier.

2. The printing control device described in claim 1, wherein:
    the print command unit commands printing the specific print element to which the style is applied based on the style information associated to the identifier, and the code image based on the code information acquired by the code information acquisition unit.

3. The printing control device described in claim 1, wherein:
    the specific print element denotes a parameter added to the identifier.

4. The printing control device described in claim 3, wherein:
    the print command unit commands printing with text corresponding to the identifier added to the parameter.

5. The printing control device described in claim 1, wherein:
    the identifier indicates a product code; and
    the condition evaluation unit determines that the condition is satisfied when a product identified by the parameter is determined to be an advertised product as a result of searching a product database.

6. The printing control device described in claim 1, wherein:
    the identifier denotes an expiration date; and
    the condition evaluation unit determines that the condition is satisfied when a number of days left to a date identified by the parameter is less than or equal to a specified number of days based on a time kept by a clock unit.

7. The printing control device described in claim 1, wherein:
    the style information includes information relating to one or more of character size, character style, underlining, ruled line, border, text effect, text color, line color, background color, character font, image addition, or printing position.

8. A printer driver configured as the printing control device described in claim 1, and installed in a computer that produces the code information.

9. A conversion device configured as the printing control device described in claim 1, and connectable to a computer that produces code information and to a printer.

10. A printer that prints based on code information for printing a code image,
    the code information containing at least one attribute data set, each attribute data set including an identifier for identifying the attribute data set and a parameter added to the identifier, and
    the printer comprising:
        a code information acquisition unit that acquires the code information;
        a storage unit that associates and stores the identifier, style information for printing with a style applied to a specific print element, and a condition for determining based on the parameter whether to apply the style;
        an attribute data set extraction unit that extracts from the acquired code information the attribute data set containing the identifier stored in the storage unit;
        a condition evaluation unit that determines if the parameter contained in the extracted attribute data set satisfies the condition associated in the storage unit to the identifier contained in the attribute data set; and
        a print unit that, when the condition evaluation unit determines that the parameter satisfies the condition, prints based on the style information associated to the identifier.

11. A printing system comprising:
a printer; and
a computer in which the printer driver described in claim 8 is installed and which generates print data containing the code information and sends the print data to the printer.

12. A printing system comprising:
a conversion device configured as the printing control device described in claim 1;
a computer that generates print data containing a code information and sends the print data to the conversion device; and
a printer connected to the conversion device for printing the print data.

13. A printing system comprising:
the printer described in claim 10; and
a computer that generates print data containing a code information and sends the print data to the printer.

14. A control method of a printing control device for controlling a printer that prints a code image, comprising:
acquiring code information, which is information for printing the code image and contains at least one attribute data set including an identifier and a parameter added to the identifier;
searching a storage unit that stores the identifier associated to style information for printing with a style applied to a specific print element and a condition for determining based on the parameter whether to apply the style, and extracting from the acquired code information the attribute data set containing the identifier stored in the storage unit;
determining if the parameter contained in the extracted attribute data set satisfies the condition associated in the storage unit to the identifier contained in the attribute data set; and
applying a print command to the printer based on the style information associated to the identifier when the parameter is determined to satisfy the condition.

15. A control method of a printer that prints a code image, comprising:
acquiring code information, which is information for printing the code image and contains at least one attribute data set including an identifier and a parameter added to the identifier;
searching a storage unit that stores the identifier associated to style information for printing with a style applied to a specific print element and a condition for determining based on the parameter whether to apply the style, and extracting from the acquired code information the attribute data set containing the identifier stored in the storage unit;
determining if the parameter contained in the extracted attribute data set satisfies the condition associated in the storage unit to the identifier contained in the attribute data set; and
printing based on the style information associated to the identifier when the parameter is determined to satisfy the condition.

16. The control method described in claim 15, wherein the storage unit stores
a plurality of identifiers,
a plurality of style information corresponding to a plurality of printing styles, wherein each of the plurality of style information is associated with one of the plurality of identifiers, and
a plurality of different conditions, wherein each of the plurality of different conditions is associated with one of the plurality of identifiers and one of the plurality of style information and determines whether or not to apply the printing style corresponding to said one of the plurality of style information.

17. The control method described in claim 15, wherein the storage unit stores
a plurality of identifiers,
a plurality of parameters, wherein each of the plurality of parameters is associated with one of the plurality of identifiers,
a plurality of style information corresponding to a plurality of printing styles, wherein each of the plurality of style information is associated with one of the plurality of parameters, and
a plurality of different conditions, wherein each of the plurality of different conditions is associated with one of the plurality of parameters and one of the plurality of style information and determines whether or not to apply the printing style corresponding to said one of the plurality of style information.

18. The control method described in claim 17, wherein
said searching comprises searching, among the plurality of identifiers in the storage unit, for an identifier matching the identifier contained in the extracted attribute data set,
said determining comprises, when the identifier matching the identifier contained in the extracted attribute data set is found in the storage unit, determining whether the parameter contained in the extracted attribute data set satisfies the condition associated in the storage unit with the parameter associated with the found identifier, and
said printing comprises, when the parameter contained in the extracted attribute data set satisfies the condition, printing the code image based on the printing style corresponding to the style information associated in the storage unit with the condition.

19. The control method described in claim 17, wherein one of the plurality of identifiers is associated with different parameters among the plurality of parameters.

20. The control method described in claim 15, wherein the style information indicates an item to be printed at said printing, said item is not included in the code information.

* * * * *